United States Patent
Sayeed et al.

(10) Patent No.: US 9,030,988 B2
(45) Date of Patent: May 12, 2015

(54) METHOD AND APPARATUS FOR SWITCHING BETWEEN MULTICAST/BROADCAST AND UNICAST SERVICE

(71) Applicants: Zulfiquar Sayeed, Hightstown, NJ (US); Edward Grinshpun, Freehold, NJ (US)

(72) Inventors: Zulfiquar Sayeed, Hightstown, NJ (US); Edward Grinshpun, Freehold, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 183 days.

(21) Appl. No.: 13/722,317

(22) Filed: Dec. 20, 2012

(65) Prior Publication Data
US 2014/0177504 A1    Jun. 26, 2014

Related U.S. Application Data

(60) Provisional application No. 61/666,006, filed on Jun. 29, 2012.

(51) Int. Cl.
H04W 4/06    (2009.01)
H04W 72/00   (2009.01)

(52) U.S. Cl.
CPC .............. *H04W 4/06* (2013.01); *H04W 72/005* (2013.01)

(58) Field of Classification Search
None
See application file for complete search history.

(56) References Cited

U.S. PATENT DOCUMENTS

| | | | |
|---|---|---|---|
| 6,704,576 B1 | 3/2004 | Brachman et al. | |
| 2006/0047845 A1 | 3/2006 | Whited | |
| 2007/0183358 A1 | 8/2007 | Cai | |
| 2009/0312008 A1* | 12/2009 | Lindoff et al. | 455/423 |
| 2011/0007668 A1* | 1/2011 | Shang et al. | 370/254 |
| 2011/0106961 A1 | 5/2011 | Glasser et al. | |
| 2013/0024582 A1* | 1/2013 | Rodrigues | 709/231 |
| 2013/0028118 A1* | 1/2013 | Cherian et al. | 370/252 |

FOREIGN PATENT DOCUMENTS

| | | |
|---|---|---|
| EP | 2043404 A1 | 4/2009 |
| WO | 2007075398 A2 | 7/2007 |
| WO | 2009011621 A1 | 1/2009 |
| WO | 2009095369 A1 | 8/2009 |
| WO | 2011035168 A1 | 3/2011 |
| WO | 2011053858 A1 | 5/2011 |

OTHER PUBLICATIONS

PCT Patent Application No. PCT/US2013/047605, International Search Report mailed Sep. 18, 2013, 4 pgs.

(Continued)

*Primary Examiner* — Faruk Hamza
*Assistant Examiner* — Diane Lo
(74) *Attorney, Agent, or Firm* — Davidson Sheehan LLP (57) ABSTRACT

Embodiments of the claimed subject matter provide a method and apparatus for switching between multicast/broadcast and unicast service. Some embodiments of the method include determining a number of first users in a first cell receiving one or more first sessions for unicasting content in response to a second user in the first cell requesting the content. Some embodiments of the method also include assigning the first and second users to a second session for broadcasting or multicasting time-aligned content in response to the number of first users being larger than a threshold.

24 Claims, 5 Drawing Sheets

(56) References Cited

OTHER PUBLICATIONS

Jaime Garcia et al, A broadcasting enabled Residential Gateway for Next Generation Networks, Broadband Convergence Networks, 2nd IEEE/IFIP International Workshop, May 1, 2007, pp. 1-12.
PCT Patent Application No. PCT/US2013/047890, Partial International Search mailed Oct. 10, 2013, 2 pgs.
U.S. Appl. No. 13/722,076, filed Dec. 12, 2012, entitled "Method and Apparatus for Providing Broadcast or Multicast Service to Obstructed User Equipment".
U.S. Appl. No. 13/924,378, filed Jun. 21, 2013, entitled "Seamless Make-Before-Break Transfer of Multicast/Broadcast Sessions".
International Search Report and Written Opinion correlating to PCT/US2013/048118 dated Oct. 9, 2013, 11 pages.
3rd Generation Partnership Project, Local IP Access and Selected IP Traffic Offload (LIPA-SIPTO), Technical Specification Group Services and System Aspects, 23.829 V10.0.1, 3rd Generation Partnership Project, Oct. 2011.
3rd Generation Partnership Project, Service requirements for Home Node B (HNB) and Home eNode B (HeNB), Technical Specification Group Services and System Aspects, 22.220 V11.6.0, 3rd Generation Partnership Project, Sep. 2012.
3rd Generation Partnership Project, General Packet Radio Service (GPRS) enhancements for Evolved Universal Terrestrial Radio Access Network (E-UTRAN) access, Technical Specification Group Services and System Aspects, 23.401 V12.0.0 , 3rd Generation Partnership Project, Mar. 2013.
3rd Generation Partnership Project, Local IP access (LIPA) mobility and Selected IP Traffic Offload (SIPTO) at the local network, Technical Specification Group Services and System Aspects, 23.859 V12.0.1 , 3rd Generation Partnership Project, Apr. 2013.
3rd Generation Partnership Project, Service aspects; Service principles, Technical Specification Group Services and System Aspects, 22.101 V12.4.0 , 3rd Generation Partnership Project, Mar. 2013.
3rd Generation Partnership Project; Technical Specification Group Services and System Aspects; Multimedia Broadcast/Multicast Service (MBMS); Architecture and functional description (Release 11) 3GPP TS 23.246 V11.1.0 (Mar. 2012) Technical Specification.

* cited by examiner

METHOD AND APPARATUS FOR SWITCHING BETWEEN MULTICAST/BROADCAST AND UNICAST SERVICE

CROSS-REFERENCE TO RELATED APPLICATIONS

This application claims priority to U.S. Provisional Patent Application 61/666,006, filed on Jun. 29, 2012.

BACKGROUND

This application relates generally to communication systems, and, more particularly, to wireless communication systems.

Wireless communication systems use a network of access points such as base stations to provide wireless connectivity to various access terminals, such as mobile units, user equipment, or other devices that are enabled for wireless communication. The coverage area of a wireless communication system is typically divided into a number of geographic areas that are conventionally referred to as cells or sectors. The coverage area of each cell in the wireless network is limited by the propagation loss of radio signals transmitted by access points that provide coverage to the cell. Thus, the coverage area of each cell is determined by the location and the transmit power or distribution pattern of the access point, as well as the geography of the cell, the location of any interfering objects, antenna geometry, topology and environmental conditions, shadow fading and the like. For example, the coverage area of a cell may be reduced if a building or a mountain is present near the access point. The boundaries of the cells are not rigidly defined and may vary with time. Thus, coverage areas may overlap such that multiple access points may provide coverage to the overlapping regions, although the strength of the signal provided within the overlapping regions may be different for the different access points. Overlapping coverage areas may help to ensure session transitions for mobile user equipment from one cell to another cell.

Wireless communication standards such as Long Term Evolution (LTE, LTE-Advanced) support broadcasting services such as the multimedia broadcast multicast service (MBMS) or the enhanced multimedia broadcast multicast service (eMBMS). The MBMS services broadcast or multicast data from base stations over the air interface on channels that can be received by one or more users. The eMBMS is an enhanced version of MBMS that provides additional features such as an architecture and physical layer enhancements that allow the eMBMS service to carry multimedia information to user equipment. The eMBMS service can transmit information towards user equipment by broadcasting or multicasting to the user equipment in a multicast broadcast single frequency network (MB-SFN) mode. An SFN is generally understood to be a broadcast network where more than one transmitter simultaneously or concurrently sends the same signal over the same frequency channel. The MB-SFN mode is used to transmit the same information from all of the base stations in a selected group of cells or coverage area. Each of the base stations in the MB-SFN area transmits the same content time-aligned in the same resource blocks of the physical layer. Constructive combination of the signals transmitted by the different base stations in the MB-SFN area enhances the received signal strength and reduces interference within the cells of the MB-SFN area.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Conventional wireless communication systems predetermine the MB-SFN areas. For example, service providers may predict usage of different MBMS channels and then allocate cells to MB-SFN areas based upon the predicted usage. For example, service providers may allocate cells in a particular area to an MB-SFN when a program of particular interest to people in this area, such as a sporting event, is scheduled to take place. However, conventional wireless communication systems are not able to dynamically reconfigure the MB-SFN areas in response to changes in the number of users subscribing to programs in particular cells. The disclosed subject matter is directed to addressing the effects of one or more of the problems set forth above.

In one embodiment, a method is provided for switching between multicast/broadcast and unicast service. Some embodiments of the method include determining a number of first users in a first cell receiving one or more first sessions for unicasting content in response to a second user in the first cell requesting the content. Some embodiments of the method also include assigning the first and second users to a second session for broadcasting or multicasting time-aligned content in response to the number of first users being larger than a threshold.

In another embodiment, an apparatus is provided for switching between multicast/broadcast and unicast service. Some embodiments of the apparatus include a controller that is configurable to determine a number of first users in a first cell receiving one or more first sessions for unicasting content in response to a second user in the first cell requesting the content. Some embodiments of the controller are also configurable to assign the first and second users to a second session for broadcasting or multicasting time-aligned content in response to the number of first users being larger than a threshold.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, conventional wireless communication systems are not able to dynamically reconfigure MB-SFN areas in response to changes in the number of users subscribing to programs in particular cells. Some embodiments described herein therefore allow the wireless communication system to monitor numbers of unicast sessions of the same content in cells within the system, e.g. using a controller or platform implemented in the system. The controller can add one or more cells to an MB-SFN area in response to the number of concurrent unicast, same-content sessions in the cell exceeding a threshold value. In the case of unicast sessions, a course time alignment of the unicast sessions to different users may be determined by the program availability. For example, unicast transmissions of a "live" program may be coarsely time aligned, and therefore concurrent, at least in part because of the requirement that the users perceive the program as being presented "live." The threshold for adding cells to the MB-SFN area may be determined by comparing the capacity saved by adding the cell to the MB-SFN area (e.g., the capacity gain from converting unicast traffic to broadcast/multicast traffic) to the capacity penalty for reconfiguring the adjacent cells to form the protection area. Modeling performed by the inventors indicates that an appropriate threshold value may be one user in some embodiments.

If the controller determines that converting unicast sessions in the cell to a broadcast/multicast session results in a net capacity gain, the controller may initiate a single broadcast/multicast session in the cell and then assign the requesting user to the broadcast/multicast session. Existing unicast sessions in the cell are also upgraded to the broadcast/multicast session. Some embodiments may reconfigure adjacent cells to transmit the same information time-aligned in the same resource blocks as the added cell, e.g. to form a border area around the MB-SFN area. Additional cells neighboring the MB-SFN area or the border area may also be instructed to bypass transmission during the allocated resource blocks in some embodiments. These cells may be referred to as a protection area. Some embodiments of the controller may allocate a unicast session to the requesting user if the controller determines that converting unicast sessions in the cell to a broadcast/multicast session does not result in a net capacity gain.

In some embodiments, cells that are already part of an MB-SFN area can be removed from the MB-SFN area in response to the number of unicast, same-content sessions in the cell falling below another threshold value, which may be the same or different that the threshold for adding cells to the MB-SFN area. Any remaining sessions in the removed cells may be transferred from a broadcast/multicast session to one or more unicast sessions. Some embodiments may reconfigure adjacent cells to modify or remove the protection area around the MB-SFN area in response to removing the cell from the MB-SFN area. The threshold for removing cells from the MB-SFN area may be determined by the capacity savings and penalties caused by tearing down the broadcast/multicast session to remove the cell from the MB-SFN area, establishing unicast sessions for any remaining user equipment, and reconfiguring adjacent cells so that they are not required to transmit the same content as any cells remaining in the MB-SFN area.

Figure 1:
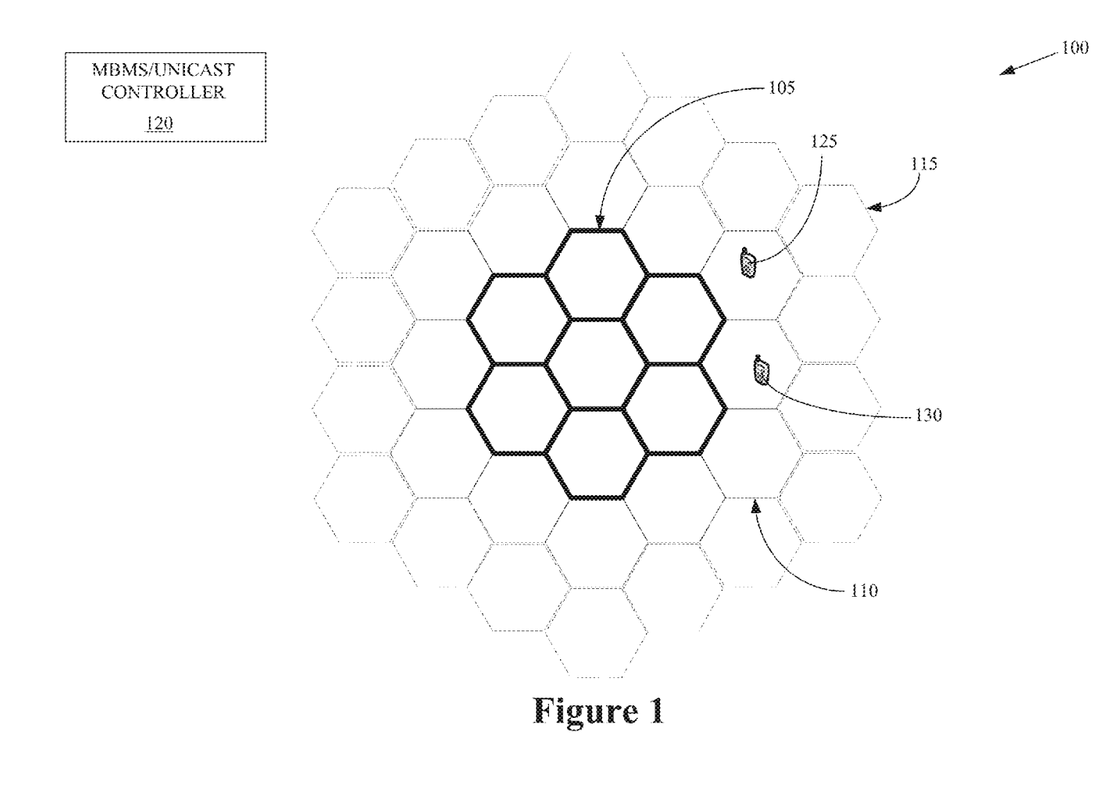
FIG. 1 conceptually illustrates a first exemplary embodiment of a wireless communication system.

FIG. 1 conceptually illustrates a first exemplary embodiment of a wireless communication system 100. In the illustrated embodiment, the wireless communication system 100 includes base stations or other access points (not shown in FIG. 1) that provide wireless connectivity to a corresponding plurality of cells 105 indicated by bold solid-line hexagons, cells 110 indicated by solid-line hexagons, and cells 115 indicated by dashed line hexagons. In the interest of clarity, only one of each type of cell 105, 110, 115 is indicated by a reference numeral in FIG. 1. Persons of ordinary skill in the art having benefit of the present disclosure should appreciate that the hexagons are idealized representations of the cells 105, 110, 115. The geographic extent of actual cells may depend on factors including, but not limited to, geography, topology, environmental conditions, transmission powers, or transmission power distributions and may therefore be irregular or time-variable.

The wireless communication system 100 includes a controller 120 that is used to configure the cells 105, 110, 115 in the wireless communication system 100 for unicast transmissions or multicast/broadcast transmissions such as transmissions of a multimedia broadcast multicast service (MBMS). As used herein, the term "multicast" may be used to refer to transmission of information over a channel or group of channels that can be received or accessed by multiple users such as users that subscribe to the MBMS service. As used herein, the term "broadcast" may also be used to refer to transmission of information over a channel or group of channels that can be received or accessed by multiple users. Broadcasting and multicasting may be distinguished at least in part because multicasting may provide the capability for forming multicast groups of users. As used herein, the term "broadcast/multicast session" should be understood to refer to a session that can be used to carry broadcast or multicast transmissions. Examples of broadcast/multicast sessions include, but are not limited to, MBMS sessions or eMBMS sessions. Furthermore, the broadcast/multicast session does not necessarily carry either broadcast or multicast transmissions at any particular time because the transmissions may depend on the available programming and the choices made by individual users. Broadcasting or multicasting can be contrasted with unicasting, in which information is transmitted from a base station or access point to a single user and other users are not authorized or able to access the unicast information. Cells may broadcast or unicast data to users such as the users 125, 130. As used herein, the term "user" may refer to wireless devices such as user equipment or to a person using the wireless device to access the system 100.

Cells 105 in the illustrated embodiment are configured to multicast the same content in a time-aligned manner using the same resource blocks on the downlink. Time alignment of the transmission may enhance the reception gain due to the constructive combination of signals from the cells 105. Persons of ordinary skill in the art having benefit of the present disclosure should appreciate that the phrase "time-aligned" indicates that the signals transmitted from the different cells 105 are temporally aligned within a tolerance that allows constructive combination of the received signals. For example, the Long Term Evolution (LTE) releases 9 and 10 define new physical layer parameters that may be optimized for the simultaneous or concurrent reception of the same broadcast or multicast signal from more than one transmitter in the same resource blocks. The reception area may be referred to as a Multicast Broadcast Single Frequency Network (MB-SFN) area. In some embodiments, such as those implemented in frequency division duplex (FDD) or time division duplex (TDD) LTE systems, the maximum capacity that can be used for a downlink multimedia delivery service such as eMBMS may be limited to 60% of the carrier bandwidth. Some embodiments may alternatively activate a parallel radio infrastructure for providing the downlink multimedia service when the required multicast bandwidth exceeds a threshold value such as 60% of the carrier bandwidth.

Resource blocks may be defined in terms of time intervals such as subframes and frequency ranges such as sub-bands in an orthogonal frequency division multiplexing (OFDM) system. However, some embodiments of the wireless communication system 100 may define resource blocks using time, frequency, sub-carriers, tones, or combinations thereof. The cells 105 may receive content from an entity within the wireless communication system 100 or from a third party provider and then multicast the content in a time-aligned manner over an allocated subset of the resource blocks. For example, the cells 105 may receive the content over a backhaul link to the controller 120. Users in the area defined by the cells 105 may therefore receive the same multicast signal concurrently from more than one cell 105.

Cells 110 may also multicast the content in a time-aligned manner over the allocated subset of the resource blocks. However, the reception gain in the cells 110 may not be as large as the reception gain in the cells 105 due to interference from other neighboring cells such as the cells 115, which are not constrained to multicast the content in the time-aligned manner over the allocated subset of the resource blocks. Some embodiments of the wireless communication system 100 may be configured to reduce inter-cell interference between the cells 105, 110 and the cells 115 by instructing the cells 115 to bypass transmission in the subset of the resource blocks that are allocated to the cells 105, 110 for broadcasting or multicasting. In some embodiments, the cells 105 may be referred to as an MB-SFN area, the cells 110 may be referred to as a border area, and the cells 115 may be referred to as a protection area for the MB-SFN area defined by the cells 105.

The controller 120 may assign cells to the respective areas based on criteria including the number of users that are concurrently accessing the same content within each cell. In the illustrated embodiment, the cells 105 are assigned to the MB-SFN area because the number of users that are concurrently accessing the same content exceeds a threshold. For example, two or more users in each of the cells 105 may be concurrently receiving the same content and so the controller 120 may assign the cells 105 to the MB-SFN areas so that the cells 105 multicast the same time-aligned content in the same resource blocks. However, persons of ordinary skill in the art having benefit of the present disclosure should appreciate that some embodiments of the controller 120 may use different thresholds or different criteria for determining the thresholds for assigning cells to MB-SFN areas so that one or more broadcast/multicast sessions are transmitted simultaneously or concurrently by the cells in the MB-SFN areas in the same resource blocks.

The cells 110 may be assigned to the border area because they are adjacent or neighboring to one of the cells 105, even though the number of users in the cells 110 may be smaller than the threshold number. The controller 120 may assign cells 115 to the protection area because they are adjacent or neighboring to one of the cells 105, 110. Some embodiments of the controller 120 may instruct the cells 115 to bypass transmission during the resource blocks that are allocated for broadcasting or multicasting of the time-aligned content by the cells 105, 110. The controller 120 may also modify assignments of the cells to the respective areas in response to changes in the wireless communication system 100.

Figure 2:
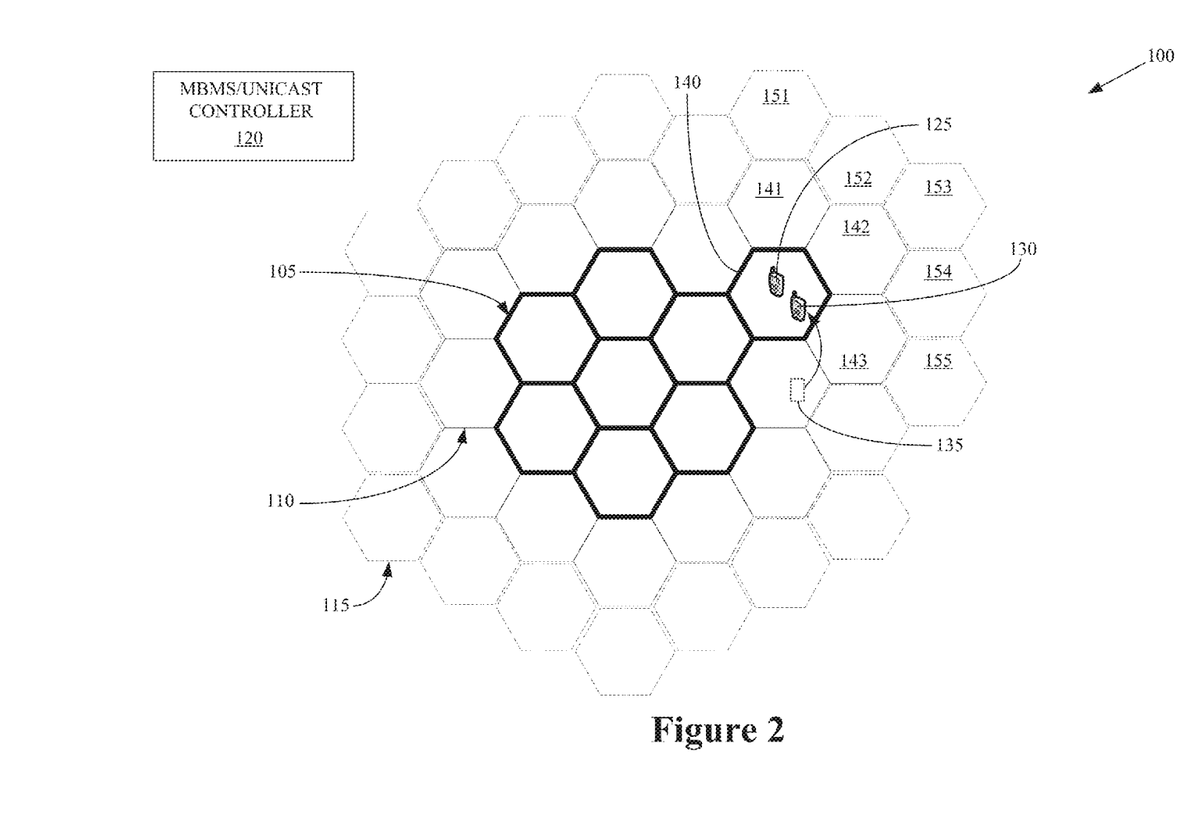
FIG. 2 conceptually illustrates the first exemplary embodiment of the wireless communication system shown in FIG. 1 following handoff of user equipment from its previous location to a cell including other user equipment.

FIG. 2 conceptually illustrates the first exemplary embodiment of the wireless communication system 100 following handoff of user equipment 130 from its previous location 135 to a cell 140 including other user equipment 125. In the illustrated embodiment, user equipment 125, 130 were concurrently receiving the same content using unicast sessions associated with the wireless communication system 100, e.g., as depicted in FIG. 1. The controller 120 may determine that handoff of user equipment 130 to the cell 140 results in the number of users concurrently accessing the same content using unicast sessions in the cell 140 exceeds a threshold, as discussed herein. The controller 120 may therefore determine that the unicast sessions should be converted into a single broadcast/multicast session for transmitting the time-aligned content to user equipment 125, 130. The cell 140 may therefore be added to the MB-SFN area formed of the cells 105. For example, the controller 120 may transmit instructions or data to the cell 140 that can be used to configure the cell 140 to multicast the time-aligned content in the same resource blocks that are used by the cells 105 to multicast the time-aligned content.

Some embodiments of the controller 120 may also determine whether to add one or more cells to the border area or the protection area associated with the MB-SFN area. The border or protection cells may be added in response to the controller 120 deciding to add the cell 140 to the MB-SFN. For example, as discussed herein, the controller 120 may estimate or calculate capacity savings that may result from converting one or more cells into border cells that multicast the same time-aligned content as the cells 105, 140, even though the cells may not include multiple user equipment that have subscribed to the multicast or unicast services to receive the time-aligned content. The controller 120 may also estimate or calculate capacity penalties that may result from converting cells into border cells or protection area cells. For example, converting a cell into a protection area cell may involve reducing interference with the multicast transmission by instructing the cell to bypass transmission during the resource blocks that are used for broadcasting or multicasting the time-aligned content in the cells 105, 110, 140. Bypassing transmission from a protection area cell during these resource blocks may reduce the capacity of the protection area cell. In the illustrated embodiment, the controller 120 has provided signaling that can be used to configure the cells 141, 142, 143 as border cells and the cells 151, 152, 153, 154, 155 as protection area cells.

FIGS. 1 and 2 illustrate embodiments of a process that can be used to add the cell 140 to an MB-SFN area, as well as adding border cells 141, 142, 143 and protection area cells 151, 152, 153, 154, 155. However, persons of ordinary skill in the art having benefit of the present disclosure should appreciate that FIGS. 1 and 2 also illustrate embodiments of a process for removing cells from the different areas, e.g., if FIG. 2 illustrates the configuration of the wireless communication system 100 at an earlier time and FIG. 1 illustrates the configuration of the wireless communication system 100 at a later time following handover of user equipment 130 out of the cell 140 and into an adjacent cell. Embodiments of the controller 120 may therefore determine the relevant thresholds, capacity savings, capacity penalties, or other criteria for determining whether to remove the cell 140 from the MB-SFN area, as well as removing or converting one or more of the border cells 141, 142, 143 or protection area cells 151, 152, 153, 154, 155 from the set of border cells and protection area cells respectively. Removing or converting border or protection area cells may be performed in response to removing the cell 140 from the MB-SFN.

Persons of ordinary skill in the art having benefit of the present disclosure should also appreciate that the controller 120 may add or remove cells from the MB-SFN areas in response to the number of user equipment 130 in a cell changing in response to users initiating or terminating a service. For example, the number of users in the cell 140 may increase if one or more users initiates a service in the cell 140, which may lead to the cell 140 being added to the MB-SFN area, as discussed herein. For another example, the number of users in the cell 140 may decrease if one or more users terminates a service in the cell 140, which may lead to the cell 140 being removed from the MB-SFN area, as discussed herein.

Figure 3:
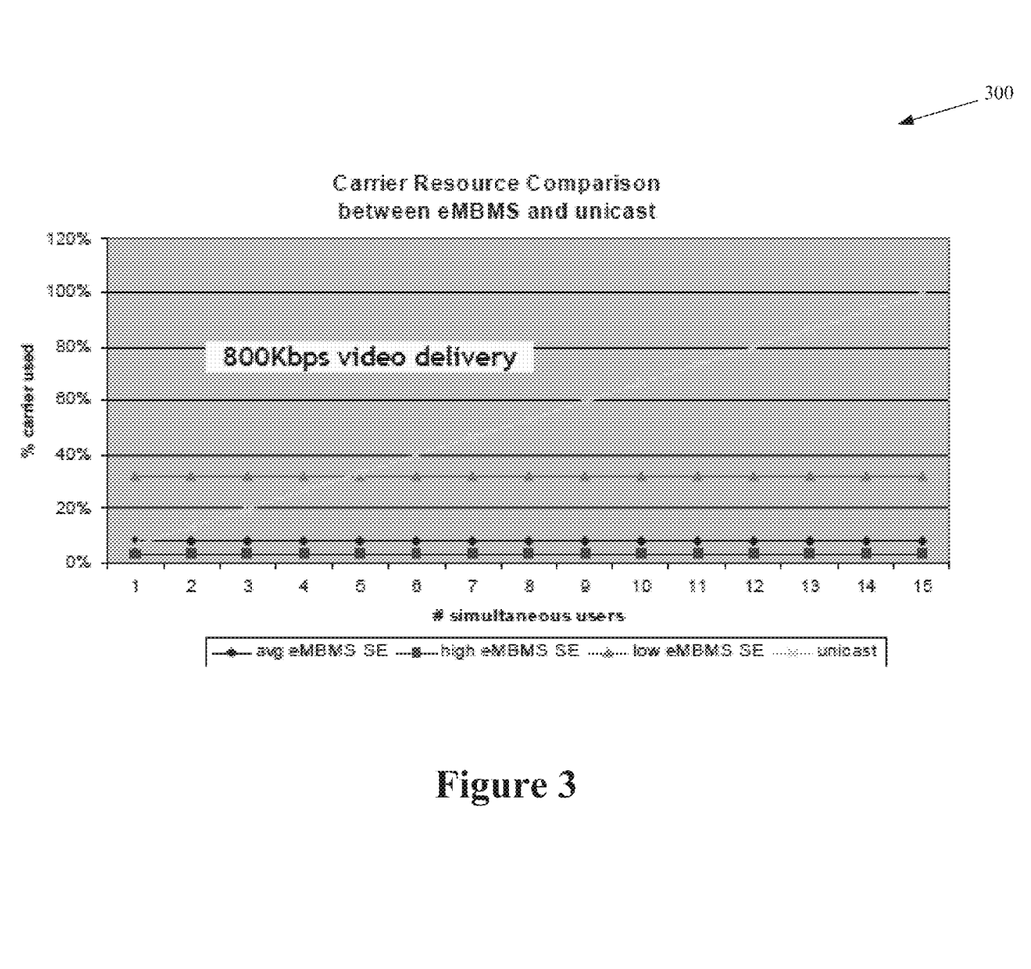
FIG. 3 depicts results of a carrier resource comparison between broadcasting or multicasting time-aligned content into a cell and unicasting the same time-aligned content into the cell.

FIG. 3 depicts results of a carrier resource comparison between broadcasting or multicasting transmissions into a cell and unicasting the same time-aligned content into the cell. In the illustrated embodiment, a simulation was used to determine the percentage of the downlink carriers that are needed to provide 800 kilobit per second (kbps) video delivery to different numbers of users in each cell. FIG. 3 therefore shows the percentage of carriers used for video delivery (% carrier used) on the vertical axis and the number of simultaneous users on the horizontal axis. The percentage of carriers used for video delivery increases linearly for unicast delivery because each additional user requires the same number of additional carriers to support the 800 kb per second video delivery. In contrast, the percentage of carriers used for multicast delivery is the same regardless of the number of users accessing the multicast information because the users all access the same multicast channel or channels.

In the illustrated embodiment, the percentage of carriers used by multicast transmissions is calculated as a function of the spectral efficiency (SE) of the multicast transmission averaged over the cell. The spectral efficiency may be measured in units of (bits per second)/(Hertz). Different network configurations may be able to achieve different spectral efficiencies. For example, higher spectral efficiencies can be maintained for a given downlink transmission power in systems that have relatively small inter-site distances. Increasing the inter-site distances or decreasing the downlink transmission power may decrease the spectral efficiency for the cell. FIG. 3 illustrates the percentage of carriers used for systems that have a low spectral efficiency, an average spectral efficiency, and a high spectral efficiency. Comparison of the percentage of carriers used by the unicast and multicast transmissions shows that broadcasting or multicasting 800 kbps video delivery using average spectral efficiency consumes a smaller percentage of the carriers than unicasting when the number of users in the cell exceeds a threshold value of 1.125 users. Accounting for the capacity savings and capacity penalties that may result from adding border cells or protection cells may increase the threshold. For example, the threshold value for an SFN area that includes border cells and a protection area and multicasts the 800 kbps video delivery using average spectral efficiency may have a threshold value of 1.25 users per cell. Increasing the spectral efficiency decreases the threshold value and decreasing the spectral efficiency increases the threshold value.

Figure 4:
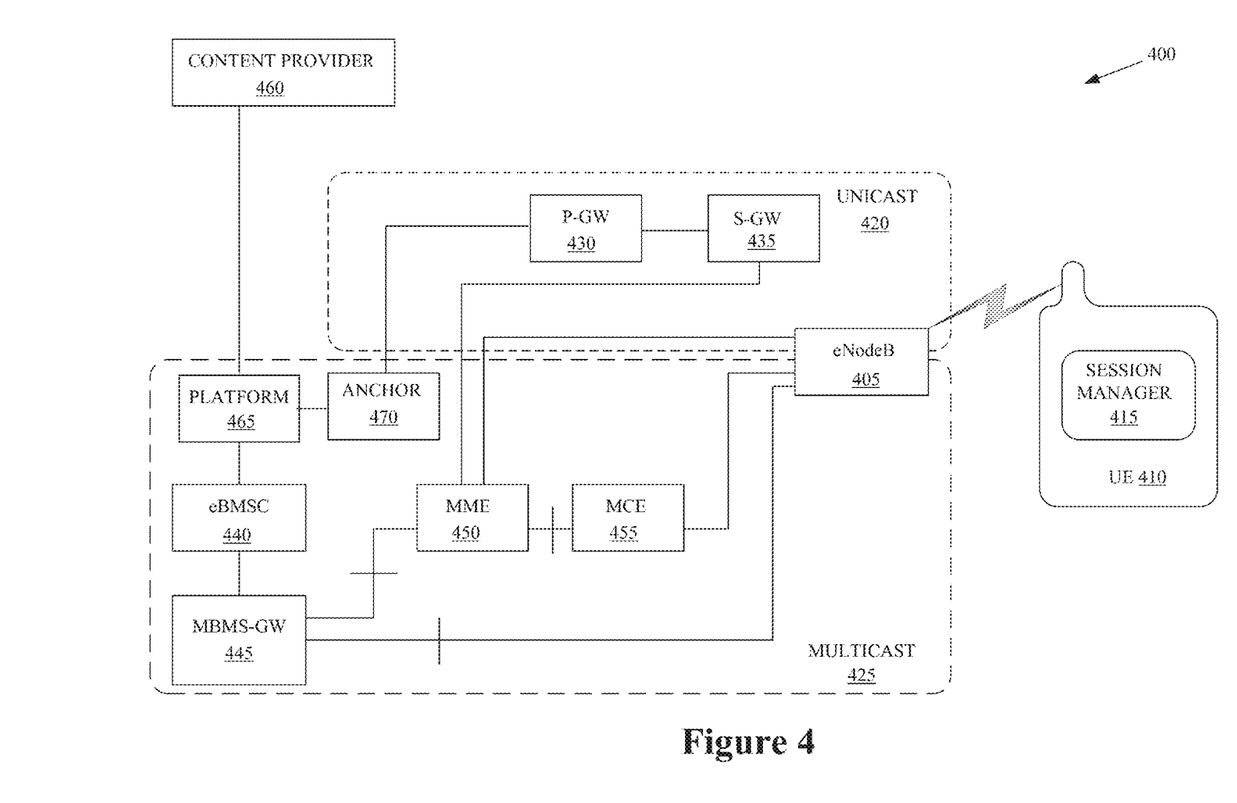
FIG. 4 conceptually illustrates a second exemplary embodiment of a wireless communication system.

FIG. 4 conceptually illustrates a second exemplary embodiment of a wireless communication system 400. Some embodiments of the wireless communication system 400 include a base station or eNodeB (eNB) 405 that can be configured to provide wireless connectivity to one or more user equipment 410. For example, the eNB 405 may be configured to unicast or multicast (perhaps as part of an MB-SFN area) content towards the user equipment 410. As discussed herein, the content of the unicast or multicast transmissions may be time aligned with transmissions by other base stations or eNBs such as the cells 105, 110, 115 depicted in FIG. 1. Some embodiments of the user equipment 410 include a session manager 415 that can be used to control or configure unicast or broadcast/multicast sessions. For example, the session manager 415 may be used to subscribe user equipment 410 to unicast or multicast services provided by the wireless communication system 400. Once subscribed, user equipment 410 may receive or access the signals transmitted over the downlink by the eNB 405, possibly in combination with time aligned downlink transmissions of the same content by other base stations or eNBs in the wireless communication system 400. The wireless communication system 400 may therefore include functionality 420, 425 that can support both unicast and broadcast downlink transmissions.

The unicast portion 420 of the wireless communication system 400 includes a packet data network (PDN) gateway (PGW) function 430 such as the PGW function defined in 3GPP TS 23.401. The PGW 430 provides connectivity from user equipment 410 to external packet data networks by being the point of exit and entry of traffic for user equipment 410. The PGW 430 performs policy enforcement, packet filtering for each user, charging support, lawful interception, and packet screening. The unicast portion 420 also includes a serving gateway (SGW) 435. The SGW 435 routes and forwards user data packets, while also acting as the mobility anchor for the user plane during inter-eNodeB handovers. For idle state user equipment 410, the SGW 435 terminates the downlink data path and triggers paging when downlink data arrives for user equipment 410. The SGW 435 may also manage or store user equipment contexts, e.g. parameters of the IP bearer service, network internal routing information, and perform replication of the user traffic in case of lawful interception.

The multicast portion 425 of the wireless communication system 400 includes a broadcast multicast service center (BMSC) 440 that provides functions for initiating multicast user service and delivery. The multicast portion 425 also includes an MBMS gateway 445 that can multicast packets to each base station or eNB 405 that is transmitting the multicast service. For example, the MBMS Gateway 445 can transmit multicast packets to each eNB in an MB-SFN area (including the eNB 405) using Internet Protocol (IP) multicasting. The MBMS Gateway 445 may also perform header compression or other operations for the multicast services.

The wireless communication system 400 depicted in FIG. 4 also includes a mobility management entity (MME) 450 in the multicast portion 425. Some embodiments of the MME 450 may be a control-node for the LTE access network and may be responsible for idle mode tracking and paging of the user equipment 410. The MME 450 may also be involved in the bearer activation/deactivation process and may be responsible for choosing the SGW 435 for user equipment 410 at the initial attach and at time of intra-LTE handover involving Core Network (CN) node relocation. The MME 450 may also be responsible for authenticating user equipment 410. A multi-cell coordination entity (MCE) 455 implemented in the multicast portion 425 may be connected to all the cells in an MB-SFN area and may allocate radio resources used by the eNBs within an MB-SFN area including the eNB 405. The MCE 455 may therefore ensure that the same resource blocks are allocated for a given service across all the eNBs of a given MBSFN area. The MCE 455 may also configure MB-SFN subframes for multicast control or data broadcasts as well as providing information to configure the L2/L3 layers in the eNBs including the eNB 405.

A content provider 460 may be used to provide content that is to be multicast or unicast to user equipment 410. Some embodiments of the wireless communication system 400 implement the content provider 460 within the system 400 and other embodiments of the wireless communication system 400 may receive content from a third party content provider 460 that is implemented outside of the wireless communication system 400. In the illustrated embodiment, content provided by the content provider 460 is received by a platform 465. Some embodiments of the platform 465 may be implemented in the multicast portion 425 of the wireless communication system 400. Portions of embodiments of the platform 465 may also be implemented in the unicast portion 420, e.g., some of the functionality of the platform 465 may be implemented in the S-GW 435.

Some embodiments of the platform 465 may be configured to maintain a session count per eNodeB. For example, the platform 465 may be able to count the number of idle or active mode user equipment 410 subscribing to each multicast or unicast service content provided by the wireless communication system 400. The platform 465 may implement a counter that can be incremented as user equipment 410 requests or subscribes to different services and can be decremented as user equipment 410 drop off or unsubscribe from the services. The platform 465 may also include a profile for each user equipment 410 that includes a time at which the user equipment 410 became associated with the current cell, an international mobile station equipment identity (IMEI) number for the user equipment 410, a user identifier, information indicating the cell that the user equipment 410 is currently camped on, information indicating one or more multimedia channels being consumed by the user equipment 410, and the like. Some embodiments of the session manager 415 may provide information indicating the program being consumed by the user equipment 410 to the platform 465 so that the multicast functionality 425 can determine how many user equipment 410 in each cell are consuming the different programs that may be available. The platform 465 may use the information provided by the session manager 415 to decide whether to switch between unicast and multicast transmissions.

The platform 465 may also be responsible for coordinating the operation of the unicast portion 420 and the multicast portion 425 of the wireless communication system. Some embodiments of the platform 465 may therefore include functionality that can be used to decide whether to switch the content provided over a channel or group of channels associated with a particular cell or eNB from a broadcast/multicast session to a unicast session or vice versa, as discussed herein. The platform 465 may also be able to determine whether to add or convert cells for use as border area cells or protection area cells, as discussed herein. Embodiments of the platform 465 may therefore be able to create or modify an MB-SFN area and generate and store a record of information identifying the MB-SFN. For example, the platform 465 may be able to choose the cell sites that make up an MB-SFN area and then store a record that includes information identifying the cell sites and the content or service that is being unicast or multicast by the cell site. Embodiments of the platform 465 may also be able to transmit session or SFN definitions to the operations and maintenance (OAM) functionalities in the wireless communication system 400 to provision eNBs such as eNB 405 to allocate MBMS sessions and SFN area definitions.

Some embodiments of the wireless communication system 400 include an anchor gateway 470, which may also be referred to as a session offload gateway because the anchor 470 may be used to offload sessions between the unicast portion 420 and the multicast portion 425. Some embodiments of the anchor gateway 470 may communicate with user equipment 410 on top of the application layer. The user equipment 410 may therefore access content via a common application regardless of whether the content is provided to the user equipment 410 via the unicast portion 420 or the multicast portion 425 of the wireless communication system. The availability of different programs may be indicated using an enhanced electronic program guide (eEPG).

In operation, the session manager 415 in the user equipment 410 may send a session request to the anchor gateway 470. The anchor gateway 470 may then check to determine whether the content provided over the requested channel or group of channels is already offered as a multicast service such as eMBMS in the cell. If the requested service is already being multicast to the cell, then the session manager 415 may perform any necessary subscription, authentication, or authorization processes to join the existing multicast service. If the requested channel is not already offered as a multicast service for that cell, the gateway 470 may communicate with the platform 465 to determine whether one or more other users are concurrently receiving the same content as unicast transmissions in the cell. If the number of unicast users exceeds a threshold, for example if more than one user is found that is receiving the unicast transmission in the cell, then the platform 465 can determine whether to create an MB-SFN area.

Some embodiments of the platform 465 can determine whether to unicast or multicast transmissions to a cell in response to changes in the system based on a set of rules or policies. For example, the platform 465 may determine whether the current criterion of transmission (e.g., the number of users subscribing to the service in the cell) make one or more of the adjacent cells a valid candidate to belong to the SFN area. If so, then the platform 465 may determine whether the amount of capacity penalty for creating a protection layer is less than the amount of capacity consumed by unicast traffic for that cell and the surrounding cells plus the loss of capacity due to forming the protection layer, e.g., due to bypassing transmission in the resource blocks allocated to the MB-SFN. If capacity is saved by broadcasting or multicasting, then the platform 465 may issue a command to the OAM for session and area provisioning down to the eNodeBs. If the capacity penalty is larger than the capacity savings from broadcasting or multicasting, then the platform 465 may assign the session as a unicast session. The anchor gateway 470 may then instruct the session manager 415 to create or configure a unicast session. If none of the adjacent cells is a valid candidate to belong to the MB-SFN area, then the platform 465 may assign a unicast carrier for the session via communication between anchor gateway 470 and the session manager 415.

Embodiments of the techniques for determining whether to unicast or multicast a service differ from the conventional multicast provisioning mechanism, which is designed as a push-based method that requires that service providers predict the most likely channels and assign SFN areas based on their predictions. Embodiments of the techniques described herein may be characterized as resembling a pull-based system where the current user equipment demand (or an average of the demand over a particular time interval) may be used to make analytical decisions based on capacity of the overall network. Some embodiments described herein may allow service providers or network operators to keep close tabs on the user and channel viewing behavior on the entire network. The relatively fine temporal granularity of the availability of such analytics (e.g., time intervals on the order of a second) may be well suited for capacity planning and SFN area administration and creation.

Figure 5:
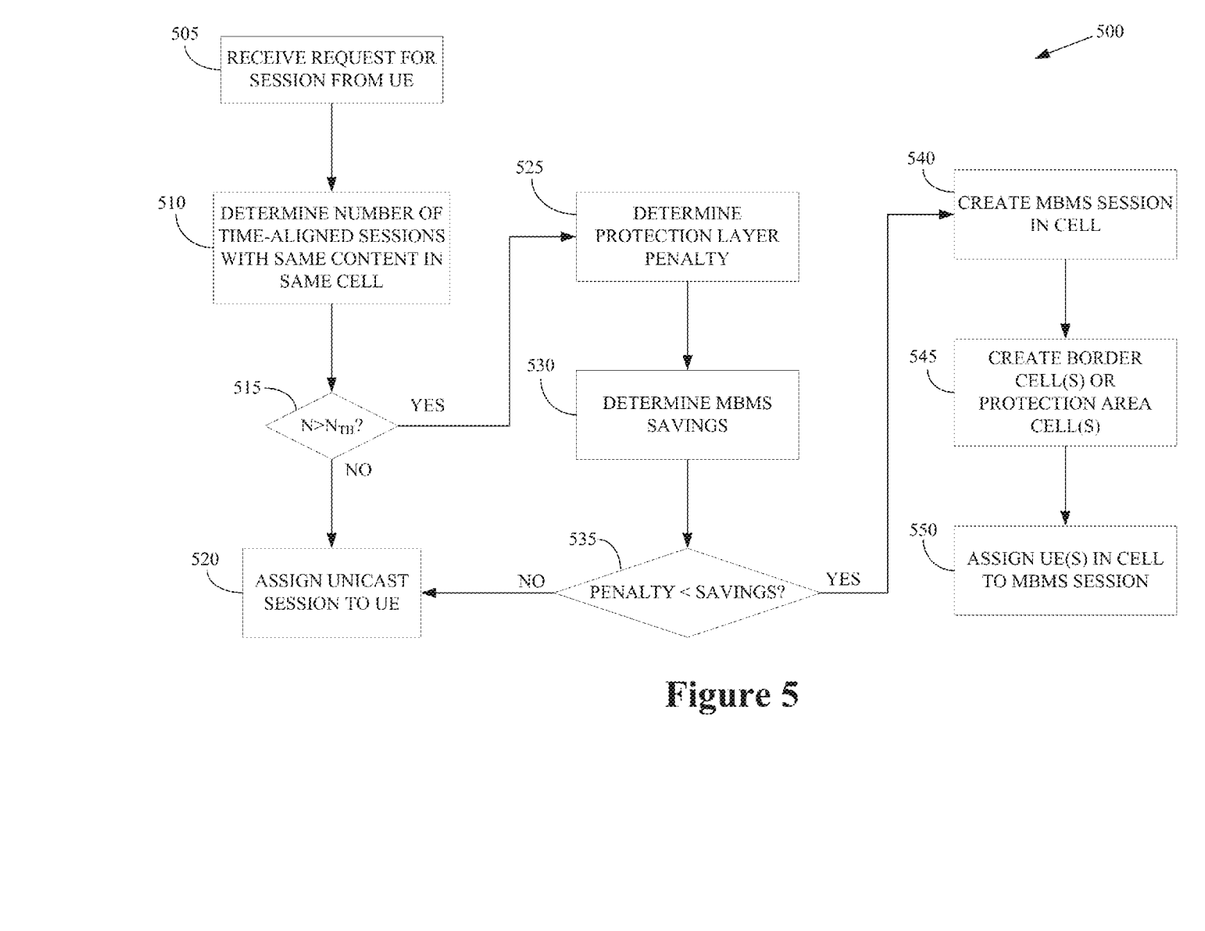
FIG. 5 conceptually illustrates one exemplary embodiment of a method for configuring broadcast/multicast or unicast transmissions to cells of a wireless communication system, such as the wireless communication systems depicted in FIGS. 1 and 4.

FIG. 5 conceptually illustrates one exemplary embodiment of a method 500 for configuring multicast or unicast transmissions to cells of a wireless communication system, such as the wireless communication systems 100, 400 depicted in FIGS. 1 and 4. Embodiments of the method 500 may be implemented in the controller 120 shown in FIG. 1 or in the platform 465 and the anchor gateway 470 shown in FIG. 4. A controller receives (at 505) a request from user equipment in a cell for a session or service that provides content such as an audio program, a video program, or a large file download such as an operating system, a new application, and the like. The controller may then determine (at 410) the number of unicast sessions that are providing the same content to the cell that includes the user equipment that made the request. Some embodiments of the controller may maintain a counter that indicates the number of sessions associated with idle or active mobile units in the cell. Other embodiments may count the sessions in response to receiving (at 505) the request. As discussed herein, communication between a session manager and a platform (such as the session manager 415 and the platform 465 shown in FIG. 4) may be used to convey information that is used to count the number of users or the number of sessions.

If the controller determines (at 515) that the number of concurrent sessions providing the same content to the cells is less than a threshold ($N_{th}$), then the controller may assign (at 520) a unicast session for providing the request the content to the user equipment. As discussed herein, the controller may therefore provide signaling that can be used to configure the cell and the user equipment for the unicast session, e.g. for provisioning quality of service (QoS) bearers. If the controller determines (at 515) that the number of sessions that are providing the same content to the cells is greater than or equal to the threshold ($N_{th}$), then the controller may decide whether to convert the unicast sessions in the cell to a single broadcast/multicast session by adding the cell to an MB-SFN area for the requested multicast service. The controller may also decide whether to convert one or more cells to border area cells by instructing the cells to multicast the requested service even though the number of sessions providing the same content to the cells is less than the threshold ($N_{th}$). The controller may also decide whether to convert one or more cells to protection area cells by instructing the cells to bypass transmission during resource blocks allocated to the broadcast/multicast session.

In the illustrated embodiment, the controller may decide how to configure the cells by determining (at 525) a capacity penalty associated with creating a protection area. The capacity penalty may include resources consumed by broadcasting or multicasting in border area cells that do not include a number of sessions that exceeds the threshold and capacity reductions that may result from interference such as interference with transmissions in protection area cells. Some embodiments of the controller may also determine (at 530) capacity savings that result from broadcasting or multicasting the same time-aligned content so that it is available to multiple users. For example, as shown in FIG. 3, additional users can access a broadcast/multicast session by subscribing to the session without increasing the resources allocated to the broadcast/multicast session. Thus, as the number of users increases, the capacity savings (relative to unicasting the information to the users) resulting from broadcasting or multicasting the same time-aligned content to multiple users in a cell increases.

The controller can then determine (at 535) whether the capacity penalty is less than the capacity savings so that there is a net gain produced by converting unicast sessions to broadcast/multicast sessions. If not, a unicast session can be assigned (at 520) to the user equipment. If so (e.g. if the capacity penalty is less than the capacity savings), the controller may create (at 540) a broadcast/multicast session such as, an MBMS session in the cell. For example, the controller may add (at 540) the cell to an MB-SFN area, as discussed herein. The controller may also create (at 545) one or more border cells or protection area cells, as discussed herein. Once the broadcast/multicast session has been established, the controller may assign (at 550) the requesting user equipment and any user equipment receiving the corresponding unicast session to the broadcast/multicast session. The unicast sessions may then be torn down. The controller may also subsequently assign (at 550) user equipment to the established broadcast/multicast session.

Embodiments of the techniques described herein may have a number of advantages over the conventional practice. For example, embodiments of the techniques described herein for switching between unicast and broadcast/multicast sessions may generate significant resource savings in a wireless communication system. Multiple unicast sessions would require 48 Mbps capacity to transmit video at 800 kbps over a channel that is watched by ten users in six cells. In contrast, the capacity consumed in the cells is 800 kbps after switching the multiple unicast sessions to a single broadcast/multicast session in an MB-SFN area that covers the six cells, which represents a 99.99% capacity savings for the six cells. One capacity penalty that results from establishing the six-cell MB-SFN for broadcasting or multicasting the video service is the capacity penalty for forming a border or protection area of approximately 18 cells around the MB-SFN area. For a wireless communication system such as the wireless communication system 100 shown in FIG. 1, protection area cells 115 may be used to protect resources corresponding to approximately 800*18 kbps. Accounting for the capacity penalties reduces the net capacity savings to approximately 84%, which is a significant savings over simply unicasting the service to each user.

| | |
|---|---|
| Channel BPS | 800 kbps |
| SFN size | 6 cells |
| users in 6 cells watching same ch | 120 |
| bandwidth required for unicast | 96,000 kbps |
| Bandwidth required for SFN cells | 800 kbps |
| Number of Cells in Protection | 18 |
| Bandwidth penalty for protection | 14,400 kbps |
| Bandwidth saved | 80,800 |
| Percentage saved by switching | 84% |

Embodiments of the techniques described herein also provide a more accurate method for counting sessions. For example, the MBMS Service Counting Function defined in 3GPP TS 36.300 V11.1.0 (2012-03) enables the MCE to perform counting and to receive counting results per MBMS service(s) within MBSFN area(s). The MCE can perform counting only for those MBMS service(s) for which access has not been denied by the admission control function for the corresponding MBMS session(s). For another example, the MBMS Counting function defined in 3GPP TS 36.440 V10.2.0 (2011-09) allows the MCE to request the eNB(s) to count and report per MBSFN area for one or more MBMS services the number of connected UEs receiving the MBMS Service or interested in receiving the service. However, idle user equipment camped on a cell can receive multicast services and both conventional approaches eliminate from the count the idle mode UEs that are receiving the eMBMS channel. Depending on the number of idle user equipment within a cell, functionality for counting both idle and active mobile units in conventional wireless communication systems may significantly impact decisions regarding whether to unicast or multicast data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be a non-transitory storage medium, magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   determining a number of first users in a first cell receiving at least one first session for unicasting content in response to a request for the content from a second user in the first cell; and
   assigning the first and second users to a second session for broadcasting or multicasting time-aligned content in response to the number of first users being larger than a first threshold and in response to determining that a capacity penalty for assigning the first and second users to the second session is less than a capacity savings for assigning the first and second users to the second session.

2. The method of claim 1, wherein assigning the first and second users to the second session comprises assigning the first and second users to the second session in response to determining that the number of first users is greater than one.

3. The method of claim 1, wherein assigning the first and second users to the second session comprises allocating a portion of downlink resource blocks to the second session for broadcasting or multicasting the time-aligned content.

4. The method of claim 3, wherein allocating the portion of downlink resource blocks to the second session comprises allocating a portion of downlink resource blocks that correspond to downlink resource blocks allocated for broadcasting or multicasting the time-aligned content in at least one first neighbor cell.

5. The method of claim 3, comprising determining the capacity penalty for instructing at least one second neighbor cell to multicast the time-aligned content in the portion of the resource blocks or bypassing downlink transmission from at least one third neighbor cell during the portion of the downlink resource blocks.

6. The method of claim 5, comprising determining the capacity savings from converting unicast transmissions of the content to multicast transmissions of the time-aligned content to users in an area associated with the cell.

7. The method of claim 6, comprising instructing said at least one second neighbor cell to multicast the time-aligned content in the allocated portion of downlink resource blocks or instructing said at least one third neighbor cell to bypass transmission in the allocated portion of downlink resource blocks.

8. The method of claim 1, comprising assigning the second user to a unicast session in response to determining that the capacity penalty is larger than the capacity savings.

9. The method of claim 1, comprising adding the first cell to a multicast broadcast single frequency network in response to the number of first users being larger than the first threshold.

10. The method of claim 1, comprising determining a number of remaining users in the first cell associated with the second session in response to at least one of the first or second users in the first cell ending reception of the multicast or handing off to a different cell.

11. The method of claim 10, comprising assigning at least one remaining user to at least one first session for unicasting the content in response to the number of remaining users being smaller than a second threshold.

12. The method of claim 11, comprising removing the first cell from a multicast broadcast single frequency network in response to the number of remaining users being smaller than the second threshold.

13. An apparatus, comprising:
a controller configured to determine a number of first users in a first cell receiving at least one first session for unicasting content in response to a request for the content from a second user in the first cell, wherein the controller is configured to assign the first and second users to a second session for broadcasting or multicasting time-aligned content in response to the number of first users being larger than a first threshold and in response to determining that a capacity penalty for assigning the first and second users to the second session is less than a capacity savings for assigning the first and second users to the second session.

14. The apparatus of claim 13, wherein the controller is configured to assign the first and second users to the second session in response to determining that the number of first users is greater than one.

15. The apparatus of claim 13, wherein the controller is configured to allocate a portion of downlink resource blocks to the second session for broadcasting or multicasting the time-aligned content.

16. The apparatus of claim 15, wherein the controller is configured to allocate a portion of downlink resource blocks that correspond to downlink resource blocks allocated for broadcasting or multicasting the time-aligned content in at least one first neighbor cell.

17. The apparatus of claim 15, wherein the controller is configured to determine the capacity penalty for instructing at least one second neighbor cell to at least one of multicast the time-aligned content in the portion of the resource blocks or bypass downlink transmission from at least one third neighbor cell during the portion of the downlink resource blocks.

18. The apparatus of claim 17, wherein the controller is configured to determine the capacity savings from converting unicast transmissions of the content to multicast transmissions of the time-aligned content.

19. The apparatus of claim 18, wherein the controller is configured to instruct said at least one second neighbor cell to at least one of multicast the time-aligned content in the allocated portion of downlink resource blocks or instruct said at least one second cell to bypass transmission in the allocated portion of downlink resource blocks.

20. The apparatus of claim 18, wherein the controller is configured to assign the second user to a unicast session in response to determining that the capacity penalty is larger than the capacity savings.

21. The apparatus of claim 13, wherein the controller is configured to add the first cell to a multicast broadcast single frequency network in response to the number of first users being larger than the first threshold.

22. The apparatus of claim 13, wherein the controller is configured to determine a number of remaining users in the first cell associated with the second session in response to at least one of the first or second users in the first cell at least one of ending reception of the multicast or handing off to a different cell.

23. The apparatus of claim 22, wherein the controller is configured to assign at least one remaining user to at least one first session for unicasting the time-aligned content in response to the number of remaining users being smaller than a second threshold.

24. The apparatus of claim 23, wherein the controller is configured to remove the first cell from a multicast broadcast single frequency network in response to the number of remaining users being smaller than the second threshold.

* * * * *